(No Model.) 2 Sheets—Sheet 2
W. SCHMIDT & P. B. SPIEGEL.
MACHINE FOR DISTRIBUTING FERTILIZERS.
No. 412,798. Patented Oct. 15, 1889.
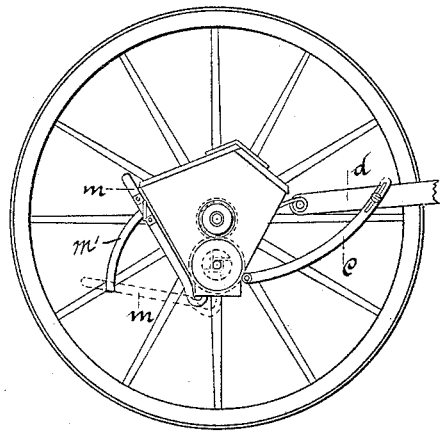
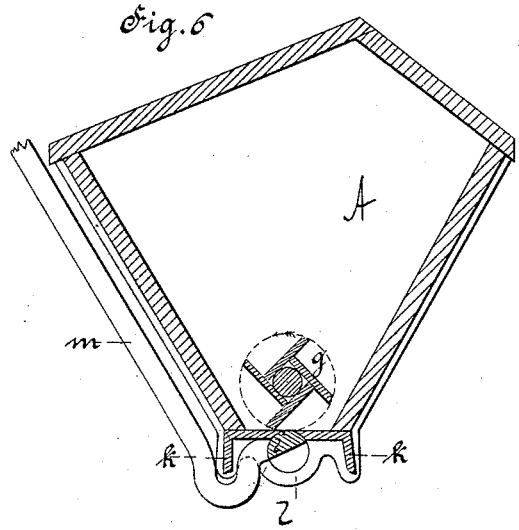

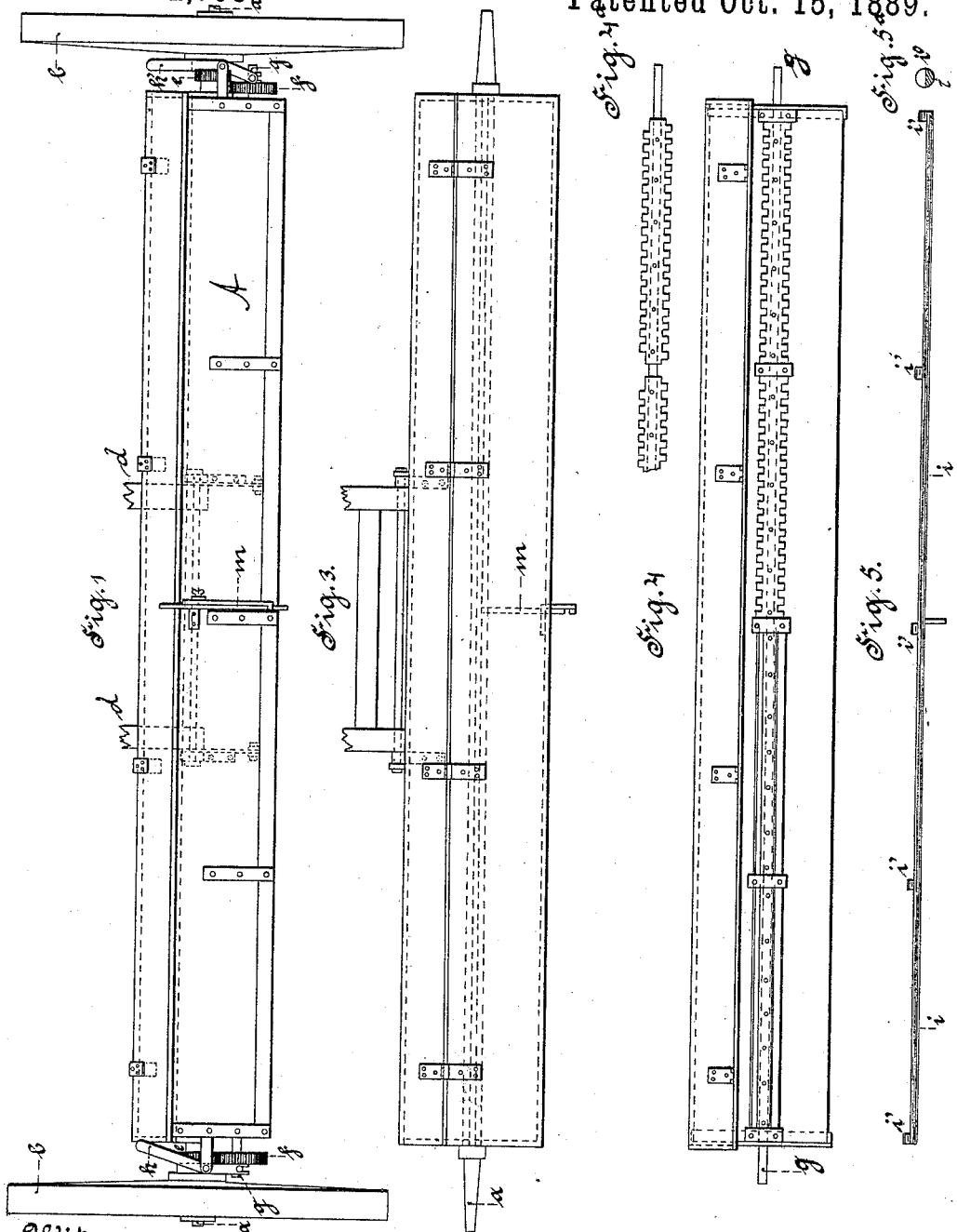

UNITED STATES PATENT OFFICE.

WILHELM SCHMIDT AND PAUL B. SPIEGEL, OF HALLE-ON-THE-SAALE, PRUSSIA, GERMANY.

MACHINE FOR DISTRIBUTING FERTILIZERS.

SPECIFICATION forming part of Letters Patent No. 412,798, dated October 15, 1889.

Application filed January 10, 1888. Serial No. 260,274. (No model.)

*To all whom it may concern:*

Be it known that we, WILHELM SCHMIDT and PAUL B. SPIEGEL, of Halle-on-the-Saale, in the Kingdom of Prussia and German Empire, have invented a new and useful Improved Machine for Distributing Fertilizers, of which the following is a specification, reference being had therein to the accompanying drawings, no patents being obtained by us anywhere for this invention.

This invention has for its object to provide for an equal or regular distribution of fertilizers over the soil by means of a machine constructed with an adjustable discharge-opening, through which the fertilizer is caused to fall by means of revolving blades arranged and operating as hereinafter described.

Figures 1 and 2 of the accompanying drawings show the improved machine in side and end elevation, respectively; and Fig. 3 is a plan of the same, the wheels being removed. Fig. 4 represents the box or hopper of the machine with the lid or cover in the open position, showing the internal stirrer according to two modifications, the blades of the stirrer on the left hand being plain, while those on the right hand are indented or toothed. Fig. 4ª illustrates another modification of the toothed blades wherein the teeth on one side correspond with recesses or spaces between the teeth on the other side of the stirrer. Figs. 5 and 5ª represent, respectively, side and end elevations, partly in section, of a cylindrical valve hereinafter described. Fig. 6 represents the box or hopper in transverse section, drawn to a larger scale.

This machine is provided with a box or hopper A for the reception of the fertilizer, this box being carried on an axle $a$ and traveling on a pair of wheels $b$. The machine is drawn by means of a pair of shafts $d$, adjustably connected to the box A by means of a slotted link C. Toothed gearing $e\ f$ transmits motion from the traveling wheels $b$ to two shafts $g\ g$, arranged in a line one with the other, each shaft being capable of being thrown in or out of gear independently, when required, by means of vers $h\ h'$. The bottom of the box or hopper A is formed, as shown more clearly in Fig. 6, by two angle-irons K, between the two inwardly-projecting flanges of which there is formed a long narrow opening of sufficient width to admit of the passage of the largest quantity of fertilizer which the machine is constructed to deliver. This opening can be partially or completely closed by means of a round bar or cylinder $i$, acting as a valve. (Shown detached in Figs. 5 and 5ª.) A segment of this round bar or cylinder is removed on one side thereof throughout its entire length, except at certain points, as indicated at $i'$. At these points the bar or cylinder $i$ is supported in suitable bearings $l$, Fig. 6, formed on the bars or plates $k$, forming the bottom of the hopper A. The edges of the long narrow opening in the bottom of the hopper are formed to fit closely against the rounded sides of the cylinder $i$, as indicated in Fig. 6, and the said cylinder is connected to a lever-handle $m$, by means of which it can be adjusted at any desired angle, so as to act as a valve and close more or less of the opening in the bottom of the hopper. Fig. 6 shows the opening completely closed, and it is evident that any desired extent of opening can be provided by shifting the lever-handle $m$ and securing it by suitable means in any position on a guide $m'$ provided for that purpose, as represented in Fig. 2. When the lever $m$ is in the position indicated by the dotted lines in Fig. 2, the valve is open to its fullest extent.

The shafts $g\ g$, working in bearings in the ends of the box A, carry four arms or blades arranged as indicated in Fig. 6. These blades are formed by plates attached to the four sides of the shaft and may have plain or straight edges, as indicated on the left hand in Fig. 4, or may be provided with teeth arranged either as indicated on the right hand in Fig. 4 or as in Fig. 4ª, in order to obtain a more effectual stirring or agitation of the materials in the hopper. The valve in the bottom of the hopper being suitably adjusted to close more or less of the discharge-opening, according to the quantity of fertilizer to be distributed, the shafts $g\ g$ are caused to rotate by the action of the traveling wheels when the machine is in motion and the arms on the stirrer are caused to move in the direction indicated by the arrows in Fig. 6. Owing to the tangential position or angle at which the stirrer-plates are attached to the shafts $g\ g$, the contents of the hopper is not only prevented from caking or forming a hollow above the opening, but is also forced through the opening in the bottom of the hopper. The plates being set tangentially or at an angle on the revolving shaft, as indicated in the drawings, Fig. 6, have a more powerful tendency to force the materials away from the center of rotation and through the discharge-opening than blades arranged radially.

What we claim, and desire to secure by Letters Patent of the United States, is—

1. In a machine for distributing fertilizers, the combination, with the hopper having the discharge-opening and an agitator located therein, of the semicircular valve co-operating with the opening in the hopper-bottom to regulate the exit of material, substantially as described.

2. In a machine for distributing fertilizers, and in combination with an adjustable opening in the bottom of the hopper, as hereinbefore described, a revolving stirrer provided with blades set at an angle, whereby the contents of the hopper is forced through the discharge-opening, the said blades being provided with toothed edges, substantially as described.

3. In a machine for distributing fertilizers, and in combination with an adjustable opening in the bottom of the hopper, as hereinbefore described, a revolving stirrer provided with blades set at an angle, whereby the contents of the hopper is forced through the discharge-opening, the said blades being provided with toothed edges, so that the teeth on one side correspond with spaces between the teeth on the other side, substantially as described.

In witness whereof we have hereunto set our hands in presence of two witnesses.

WILHELM SCHMIDT.
PAUL B. SPIEGEL.

Witnesses:
CARL BORNGRAEBER,
ALFRED A. WHITMAN.